United States Patent
Giovannini

(10) Patent No.: US 10,332,408 B2
(45) Date of Patent: Jun. 25, 2019

(54) METHOD AND DEVICE FOR ASSISTING THE PILOTING OF AN AIRCRAFT FOR ENERGY MANAGEMENT DURING AN APPROACH PHASE

(71) Applicant: Airbus Operations S.A.S., Toulouse (FR)

(72) Inventor: Andrea Giovannini, Toulouse (FR)

(73) Assignee: Airbus Operations S.A.S. (FR)

( * ) Notice: Subject to any disclaimer, the term of this patent is extended or adjusted under 35 U.S.C. 154(b) by 228 days.

(21) Appl. No.: 15/333,538

(22) Filed: Oct. 25, 2016

(65) Prior Publication Data
US 2017/0132941 A1    May 11, 2017

(30) Foreign Application Priority Data

Nov. 5, 2015 (FR) .................... 15 60601

(51) Int. Cl.
*G08G 5/02* (2006.01)
*G08B 23/00* (2006.01)
*B64D 45/04* (2006.01)

(52) U.S. Cl.
CPC .............. *G08G 5/025* (2013.01); *B64D 45/04* (2013.01); *G08B 23/00* (2013.01)

(58) Field of Classification Search
CPC .......... G08G 5/02; B64D 45/04; G08B 23/00
See application file for complete search history.

(56) References Cited

U.S. PATENT DOCUMENTS

| | | | |
|---|---|---|---|
| 7,075,457 B1 * | 7/2006 | Chidester | G08G 5/0065 340/945 |
| 7,853,370 B2 * | 12/2010 | Coulmeau | G05D 1/0676 701/14 |
| 8,346,412 B2 | 1/2013 | Lacaze et al. | |
| 8,825,366 B2 | 9/2014 | Giovannini et al. | |
| 8,948,937 B2 | 2/2015 | Constans et al. | |
| 2004/0075586 A1 * | 4/2004 | Glover | B64D 45/04 340/963 |

FOREIGN PATENT DOCUMENTS

| | | |
|---|---|---|
| FR | 2885439 A1 | 11/2006 |
| FR | 2968441 A1 | 6/2012 |
| FR | 2978587 A1 | 2/2013 |

OTHER PUBLICATIONS

FR 15 60601 Search Report dated May 26, 2016.

* cited by examiner

*Primary Examiner* — Khoi H Tran
*Assistant Examiner* — Michael Ngoc Phong Nguyen
(74) *Attorney, Agent, or Firm* — Lerner, David, Littenberg, Krumholz & Mentlik, LLP

(57) ABSTRACT

The device includes a reception unit for receiving a target energy including a target altitude and a target speed, a computation unit for computing a target energy state relative to the target energy, a computation unit for computing an energy difference between a final energy state at a final position, a computation unit for computing a dissipation distance making it possible for the aircraft to dissipate this energy difference, a computation unit for computing a limit position situated upstream of the final position, along a future flight trajectory of the aircraft, by the dissipation distance, the limit position being the most downstream position where the aircraft can dissipate the energy difference of the aircraft up to the final position, and an information transmission unit for transmitting at least the limit position to at least one user system.

14 Claims, 2 Drawing Sheets

METHOD AND DEVICE FOR ASSISTING THE PILOTING OF AN AIRCRAFT FOR ENERGY MANAGEMENT DURING AN APPROACH PHASE

FIELD OF THE INVENTION

The present invention relates to a method and a device for assisting the piloting of an aircraft, in particular of a transport aircraft, for managing the energy of the aircraft, during an approach phase for the purpose of a landing on a runway of an airport, said approach making it possible to join a so-called final position at which the aircraft must exhibit a so-called final energy state.

BACKGROUND OF THE INVENTION

Despite great progress in the automation of the cockpit, the appropriate management of the energy of the aircraft during the last stages of a flight is still a difficult task.

A flight management and guidance system, of the FMGS (Flight Management and Guidance System) type, is capable of making the aircraft fly along a predefined trajectory—comprising appropriate energy management—with minimum intervention by the pilot.

Although potentially very efficient, this solution is not the most frequently used one in real operations. In fact, air traffic control often asks aircraft which are approaching an airport follow radar guidance well before a final approach point, until being authorized to carry out the final approach.

Radar guidance provides more flexibility to air traffic control for managing unexpected situations which can, for example, be caused by unstable weather or by risks of conflict with other traffic.

Moreover, once the aircraft has abandoned a pre-planned trajectory for radar guidance, no complete trajectory (from the aircraft to the runway) is then defined. The FMGS system cannot therefore compute the guidance and control commands.

In such a situation, the most convenient way for the crew to fly the aircraft is based on the use of the automatic pilot system AP (comprising an "autothrottle" or "autothrust" AT if available).

This system allows the crew to define altitude, heading and speed targets directly via the man/machine interface of the AP/AT system. Regarding the way in which an altitude target is attained, this is normally carried out either by entering a vertical speed or slope target or by asking the FMGS system to adjust the thrust (for a constant airspeed) in order to make the aircraft climb or descend. Once the targets have been entered, the AP/AT system computes the control commands which are intended for the appropriate sub-systems (for example the engines, the control surfaces, etc.) in order to attain and follow these targets.

However, the AP/AT system does not help the crew to manage the total energy state of the aircraft, except for the reduction of workload derived from the automated following of the components of the target vector.

From a flight mechanics point of view, the authorization or the clearance ("clearance" being the English term) given by air traffic control, at the end of each loop of negotiation with the crew, can be considered as a new target total energy state of the aircraft. In particular, the speed clearance represents a target kinetic energy state, whereas the altitude clearance represents a target potential energy state. The heading clearances have no direct effect on the target total energy, but they define a lateral path and thus the total distance that the aircraft will have to fly before reaching the threshold of the runway.

A certain number of solutions have been proposed in order to solve this problem and, in certain cases, have been installed in avionics systems in order to provide the crew with assistance in the management of the energy in radar-guided operations.

These solutions comprise graphical symbols, generally displayed on the navigation display ND ("Navigation Display" being the English term) which provide the crew with visual indications for a better evaluation of the energy state.

However, the crew must still manage the energy of the aircraft. It always has the complete task of monitoring the energy state of the aircraft and of modifying, if necessary, the way in which the aircraft flies towards the prescribed targets (that is to say by acting on the airbrakes or by changing the vertical speed value programmed in the window of the automatic pilot system).

BRIEF SUMMARY OF THE INVENTION

A purpose of the present invention is to overcome this disadvantage. It relates to a method for assisting the piloting of an aircraft during an approach phase for the purpose of a landing, and more precisely a method for assisting the management of energy during approach, said approach making it possible to join a so-called final position at which the aircraft must exhibit a so-called final energy state, the purpose of said method being to assist the pilot or pilots of the aircraft in managing energy.

According to an aspect of the invention, said method comprises:

a reception step consisting of receiving a target energy comprising a target altitude and a target speed, preferably corresponding to data provided by air traffic control in the context of an authorisation or "clearance" ("clearance" being the English term);

a first computation step consisting of computing a target energy state relative to said target energy;

a second computation step consisting of computing an energy difference between the final energy state and the target energy state;

a third computation step consisting of computing a dissipation distance allowing the aircraft to dissipate said energy difference;

a fourth computation step consisting of computing a limit position, situated upstream of said final position, by said dissipation distance, along a future flight trajectory of the aircraft, said limit position being the most downstream position where the aircraft can dissipate said energy difference of the aircraft up to said final position; and an information transmission step consisting of transmitting at least said limit position to at least one user system.

Advantageously, the energy state represents a total energy. Usually, the total energy represents the total mechanical energy of the aircraft determined by the sum of a potential energy directly proportional to the altitude of the aircraft and a kinetic energy proportional to the square of the speed of the aircraft.

Thus, according to an advantageous aspect, the method automatically determines and automatically provides to at least one user system (notably to an automatic pilot system) a position corresponding to the most downstream position where the aircraft can dissipate the energy difference between the final energy state and the target energy state up to said final position. Said method thus makes it possible to automatically choose the most appropriate and most certain way (with respect to energy management) to attain energy targets. More particularly this method can be applied to the altitude and speed authorizations (or clearances), in the context of a radar-guided approach and descent phase (where the total energy of the aircraft decreases over the course of time).

This provides an efficient aid to the pilot with respect to energy management during the approach and makes it possible to overcome the aforesaid disadvantage.

Advantageously, the fourth computation step comprises a sub-step of estimating the future flight trajectory.

Moreover, in a particular embodiment, the fourth computation step comprises a step of computing an auxiliary position which is situated upstream of the limit position by a predetermined distance margin and a step of computing the distance between a current position of the aircraft and said auxiliary position, and the method comprises a guidance step consisting of guiding the aircraft such that it exhibits the target energy state at most at said auxiliary position.

Moreover, the method advantageously comprises an updating step consisting of updating the final energy state at the final position. Preferably, the updating step consists of updating the final energy state as a function of at least one of the following parameters:
a landing weight;
an altitude at an airport provided for the landing;
a wind at the airport;
an auxiliary parameter affecting the final energy state.

Moreover, in a particular embodiment, the reception step consists of carrying out:
a manual input of the target energy; and/or
an automatic input of the target energy.

Moreover, advantageously:
the first computation step consists of computing the target energy state from the target altitude, the target speed, current values of flight parameters of the aircraft and predetermined patterns; and/or
the third computation step takes account of at least one auxiliary criterion for computing the dissipation distance.

The present invention also relates to a device for assisting the piloting of an aircraft, in particular of a transport aircraft, during an approach phase (for the purpose of a landing on a runway of an airport), said approach making it possible to join a so-called final position at which the aircraft must exhibit a so-called final energy state.

According to an embodiment of the invention, said device comprises:
a reception unit configure for receiving a target energy comprising a target altitude and a target speed;
a first computation unit configured for computing a target energy state relative to said target energy;
a second computation unit configured for computing an energy difference between the final energy state and the target energy state;
a third computation unit configured for computation a dissipation distance making it possible for the aircraft to dissipate said energy difference;
a fourth computation unit configured for computing a limit position situated upstream of said final position, along a future flight trajectory of the aircraft, by said dissipation distance, said limit position being the most downstream position where the aircraft can dissipate said energy difference of the aircraft up to said final position; and
an information transmission unit configured for transmitting at least said limit position to at least one user system.

In a particular embodiment, said device comprises at least one of the following user systems:
an automatic pilot system which receives at least said limit position for guiding the aircraft; and
a display unit for displaying at least said limit position.

Moreover, advantageously, said device also comprises:
an interface allowing an operator to enter data and at least the target energy; and/or
an information transmission system making it possible to automatically enter data into said device and at least the target energy.

The present invention also relates to an aircraft, in particular a transport aircraft, which is provided with a device such as the one described above.

BRIEF DESCRIPTION OF THE DRAWINGS

The appended figures will give a good understanding of how the invention can be embodied. Identical references in these figures refer to similar elements. More particularly.

DETAILED DESCRIPTION

Figure 1:
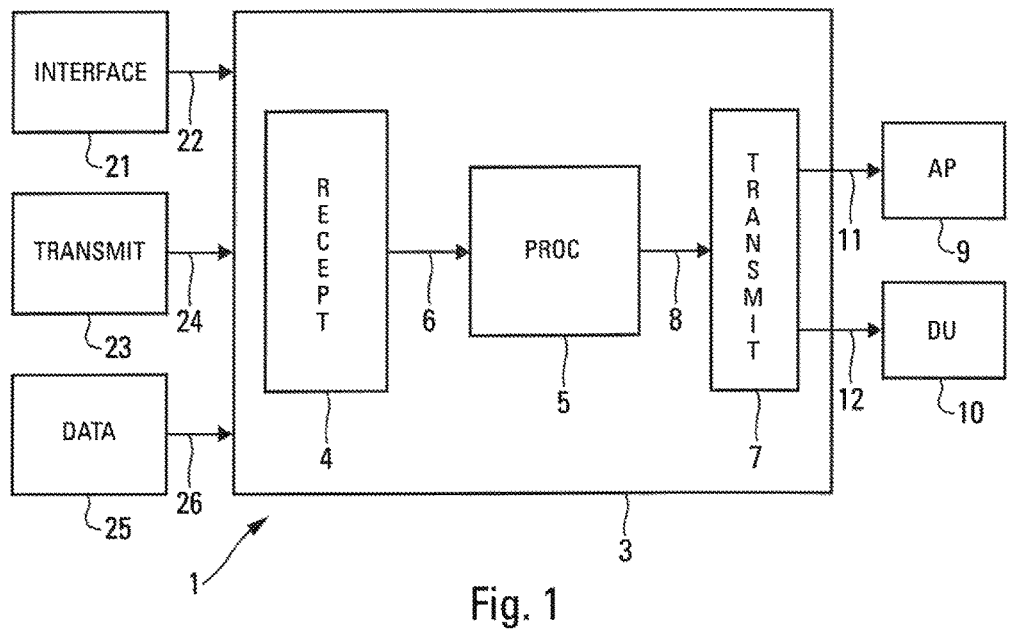
FIG. 1 is the block diagram of a particular embodiment of a device according to the invention.

The device 1, shown as a block diagram in FIG. 1 and making it possible to illustrate an embodiment of the invention, is intended to assist the piloting of an aircraft AC (FIG. 2), in particular a transport aircraft, during an approach to a runway 2 of an airport, for the purpose of a landing on that runway 2.

This device 1 is intended to assist in the management of energy and more particularly in the dissipation of energy to allow the aircraft AC to join a so-called final position Pf, at which it must exhibit a so-called final energy state ETf. This final position Pf preferably corresponds to a height, for example 50 feet (approximately 15 meters), in the direct proximity of the runway 2.

According to an embodiment of the invention, said device 1 which is onboard the aircraft comprises, as shown in FIG. 1, a central unit 3 comprising:
a reception unit 4 ("RECEPT" standing for the English term "Reception Unit") configured for receiving a target energy comprising a target altitude and a target speed;
a data processing unit 5 ("PROC" standing for the English term "Data Processing Unit") connected by the intermediary of a link 6 to the reception unit 4 and intended for processing data for generating at least one limit position a described below; and
an information transmission unit 7 ("TRANSMIT" standing for the English term "Transmission Unit") which is connected by the intermediary of a link 8 to the data processing unit 5 and which is configured for transmitting at least said limit position to at least one user system 9, 10 via a link 11, 12.

Figure 3:
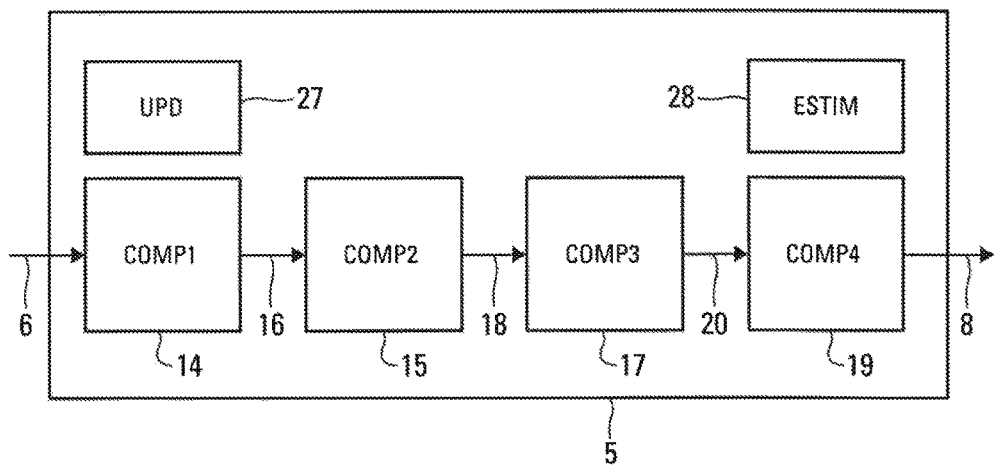
FIG. 3 is the block diagram of a data processing device of the device shown in FIG. 1.
Figure 2:
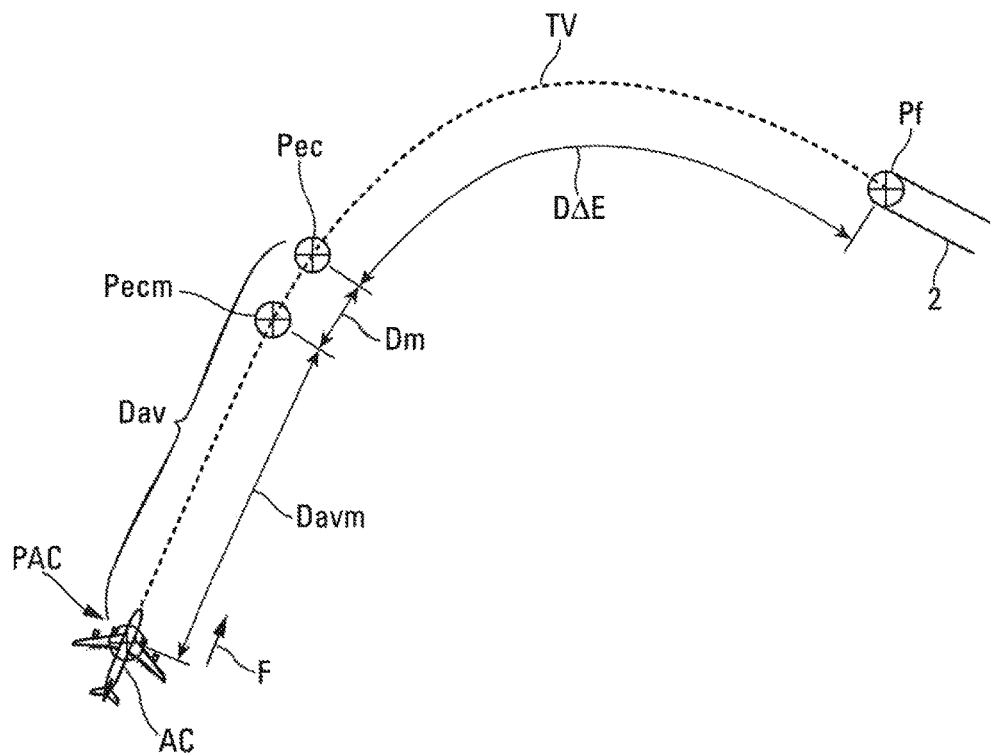
FIG. 2 is a diagrammatic representation of an estimated flight of the aircraft, on which is indicated the main positions for the purpose of energy management.

According to an embodiment of the invention, the data processing unit 5 comprises, as shown in FIG. 3:
a computation unit 14 ("COMP1" standing for the English expression "First Computation Unit") connected by the intermediary of the link 6 to the reception unit 4 and configured for computing a target energy state ETtgt relative to said energy target. In the context of the invention, an energy state represents a total energy;

a computation unit 15 ("COMP2", standing for the English expression "Second Computation Unit") connected by the intermediary of a link 16 to the computation unit 14 and configured for computing an energy difference ΔE between the final energy state ETf and the target energy state ETtgt;

a computation unit 17 ("COMP3" standing for the English expression "Third Computation Unit") connected by the intermediary of a link 18 to the computation unit 15 and configured for computing a dissipation distance DΔE allowing the aircraft to dissipate the energy corresponding to said energy difference ΔE; and a computation unit 19 ("COMP4" standing for the English expression "Fourth Computation Unit") connected by the intermediary of a link 20 to the computation unit 17 and configured for computing a limit position Pec situated upstream of said final position Pf, along a future flight trajectory TV of the aircraft AC, by said dissipation distance DΔE, as shown in FIG. 2.

In the context of the invention, the terms "upstream" and "downstream" are defined with respect to the direction of flight of the aircraft AC, which is represented by an arrow F in FIG. 2.

The limit position Pec is therefore the most downstream position where the aircraft AC can dissipate said energy difference DΔE up to said final position Pf.

Moreover, in a particular embodiment, said device 1 comprises, as shown in FIG. 1, the following user systems:

an automatic pilot system 9 ("AP" standing for the English expression "Automatic Pilot") which receives at least said limit position via the link 11 and which uses it for guiding the aircraft; and a display unit 10 ("DU" standing for the English expression "Display Unit") for displaying at least said limit position (received via the link 11) on at least one screen in the cockpit of the aircraft.

Moreover, said device 1 also comprises an interface 21 ("INTERFACE" being the English term) allowing an operator to enter data into the central unit 3 and at least one target energy, via a link 22. These data are notably provided by air traffic control in the context of a clearance. In a variant embodiment, the display unit 10 is part of this interface 21.

Moreover, in a particular embodiment, the device 1 comprises a data transmission system 23 ("TRANSMIT" standing for the English expression "Data Transmission Unit") making it possible to automatically enter data into the central unit 3 and at least the target energy, via a data transmission link 24.

These data are notably provided by air traffic control in the context of a clearance. They can also be provided, as a variant, by onboard systems.

The device 1 comprises moreover a set 25 of information sources ("DATA" standing for the English expression "Data Generation Unit") which comprise usual systems and/or sensors for determining, in particular for measuring or estimating, in the usual way, current flight conditions of the aircraft. The latter are supplied to the central unit 3 via a link 26. More precisely, the set 25 can determine at least the following flight conditions:

the height of the aircraft with respect to the ground;
the speed of the aircraft; and
the aerodynamic configuration (notably positions of the slats and flaps) of the aircraft.

Figure 4:
FIG. 4 is the block diagram of successive steps implemented by said device.

The central unit 3, such as described above, implements the following set of steps E1 à E6, as shown in FIG. 4:

E1/ a reception step implemented by the reception unit 4 and consisting of receiving a target energy comprising a target altitude and a target speed;

E2/ a first computation step implemented by the computation unit 14 and consisting of computing a target energy state ETtgt relative to said target energy;

E3/ a second computation step implemented by the computation unit 15 and consisting of computing an energy difference ΔE between the final energy state ETf of the aircraft and the target energy state ETtgt of the aircraft (ΔE=ETf−ETtgt);

E4/ a third computation step implemented by the computation unit 17 and consisting of computing a dissipation distance DΔE allowing the aircraft to dissipate said energy difference ΔE;

E5/ a fourth computation step implemented by the computation unit 19 and consisting of computing a limit position Pec situated upstream of said final position Pf (along the future fight trajectory TV of the aircraft) by said dissipation distance DΔE, as shown in FIG. 2, said limit position Pf being the most downstream position where the aircraft AC (which is in a current position PAC) can dissipate said energy difference ΔE up to said final position Pf; and E6/ an information transmission step implemented by the transmission unit 7 and consisting of transmitting at least said limit position Pec to at least one of the user systems 9 and 10, and notably to the automatic pilot system 9.

The operations implemented by some of the means of the device 1 are described below in greater detail.

The computation unit 14 computes the target energy state, in the usual way, from the target altitude, the target speed, current values of flight parameters of the aircraft (notably received from the set 25) and predetermined patterns (preferably integrated).

Moreover, the computation unit 17 can use a usual computation method for computing the distance of dissipation of the energy, for example a method such as the one described in the patents U.S. Pat. No. 8,346,412 or FR-2885439.

Moreover, in a particular embodiment, the computation unit 17 takes account of at least one auxiliary criterion for computing the dissipation distance. In particular, if there are sufficient margins with respect to the target energy, an auxiliary criterion such as for example the minimum fuel, can be introduced into the energy management strategy.

Moreover, in a particular embodiment, the computation unit 19 (or a user system 9, 10 which receives the limit position Pec) comprises an integrated computation element which computes an auxiliary position Pecm. This auxiliary position Pecm is situated upstream of the limit position Pec by a predetermined distance margin Dm, as shown in FIG. 2. The computation unit 19 (or the user system 9, 10) also comprises an integrated computation element which computes the distance Davm between the current position PAC of the aircraft AC and said auxiliary position Pecm. As shown in FIG. 2, Dm+Davm=Dav, Dav being the distance between the current position PAC of the aircraft AC and the limit position Pec. All of these distances are calculated along the flight trajectory TV.

The automatic pilot system 9 can be configured for guiding the aircraft such that it exhibits the target energy state ETtgt at said auxiliary position Pecm, in order to be certain that this condition complied with well at the limit position Pec. The automatic pilot system 9 can, notably, implement the method described in the U.S. Pat. No. 8,948, 937 or in patent application FR-2978587.

Moreover, the device 1 also comprises an updating unit 27 ("UPD" standing to the English expression "Updating Unit") which is, for example, integrated in the data processing unit 5, as shown in FIG. 3, and which is configured to update the final energy state ETf.

In a preferred embodiment the updating unit 27 updates the final energy state as a function of at least one or more of the following parameters:
the weight if the aircraft on landing;
the altitude of the airport provided for the landing;
a wind at the airport;
at least one auxiliary parameter affecting the final energy state.

The data processing unit 5 also comprises, as shown in FIG. 3, an estimation unit 28 ("ESTIM" standing for the English expression "Trajectory Estimation Unit") configured for estimating the future flight trajectory TV, used by the computation unit 19 of the aircraft. Preferably, the estimation unit 28 uses data relative to other aircraft for estimating the future flight trajectory TV, this future flight trajectory TV then depending on air traffic constraints in order to avoid risks of collision. This estimation unit 28 is, for example, integrated in the computation unit 19.

The estimation unit 28 can implement a usual method for estimating the future flight trajectory of the aircraft, in particular the one described in the patents U.S. Pat. No. 8,825,366 or FR-2968441. More particularly, the estimation unit 28 can implement the following method, automatically consisting, with the help of a database relative to obstacles and a reference vertical profile, taking account of an objective set by an operator and indicating at least a target point:

A/ of determining at least a first flight trajectory leg, starting from a current point, by carrying out the following successive operations:

a) generating at least one straight segment of predetermined length starting at the current point;

b) carrying out a validation test of each straight segment thus generated, a validation test using the database and the reference vertical profile;

c) evaluating each straight segment generated and validated, attributing it with a note which is representative of its capability of completing the set objective; and d) recording, as a flight trajectory leg which illustrates a virtual trajectory, each straight leg with the note attributed to it; and B/ implementing an iterative processing (or iterative loop), comprising the following successive operations:

a) among all of the recorded virtual trajectories, taking into account the virtual trajectory having the best note with respect to the set objective;

b) determining the possible changes of heading starting from the downstream end of that virtual trajectory;

c) for each of the possible heading changes, generating a trajectory leg starting at said downstream end and comprising at least one of the following elements: an arc of circle and a straight segment, for which a validation test is carried out;

d) for each trajectory leg generated and validated in step c), forming a new flight trajectory leg constituted by the virtual trajectory taken into account in step a), followed by said trajectory leg;

e) evaluating each trajectory leg thus formed, attributing it with a note which is representative of its capability of achieving the set objective; and f) recording each new flight trajectory leg which illustrates a virtual trajectory, with the note assigned to it.

The preceding sequence of steps B/a) to B/f) is repeated until the downstream end of the virtual trajectory having the best note at the end of a repetition (of said steps a to f) corresponds to said target point, this virtual trajectory then representing the estimated future flight trajectory.

The device 1, such as described above, notably makes it possible to automatically determine and automatically provide to at least one user system (notably an automatic pilot system) a position corresponding to the most downstream position where the aircraft can dissipate the energy difference (between the target energy state and the final energy state) up to the final position. The device 1 thus makes it possible to choose the most appropriate and most certain manner (with respect to energy management) to attain energy targets.

More particularly, though not exclusively, the device 1 can be applied to the altitude and speed authorizations (or clearances) in the context of a radar-guided approach and descent phase (where the total energy of the aircraft decreases over the course of time).

Moreover, if a longitudinal deceleration function is available and there authority is available for automatically controlling the airbrakes and the thrust of the engines, this capability can be used for attaining the required target speed, whilst further reducing the workload of the crew.

By way of illustration, the functioning of the device 1, such as described above, can exhibit, in the context of an approach phase for the purpose of a landing, the following steps in a particular example:

the central unit 3 continuously computes the instantaneous total energy of the aircraft;

the central unit 3 computes the nominal total energy of the aircraft at the threshold of the runway. This total energy is updated, if necessary, by the updating unit 27, as a function of the predicted weight on landing, the selection of slats and flaps, the temperature of the airport, the altitude at the airport, the wind at the airport, and any other parameter which can significantly affect this computation;

when a new clearance from air traffic control is received and accepted by the crew, a crew member enters the corresponding speed and altitude targets into the device 1 via the interface 21. These targets are used as the basis for computing the target total energy (or target energy state);

the computation unit 15 computes the energy difference ΔE;

the computation unit 17 computes the dissipation distance DΔE required for dissipating the energy ΔE;

as a function of the heading and the position of the aircraft relative to the runway, the computation unit 19 computes a predicted future trajectory, which brings the aircraft into a position aligned with the final approach axis at a predefined altitude;

the computation unit 19 projects 1a distance upstream along the flight trajectory TV starting at the threshold Pf of the runway 2. The limit point Pec at the end of this distance represents the last authorized position where the target energy can be attained;

the transmission unit 7 transmits the available distance, starting from the current position of the aircraft and along the trajectory, to the automatic pilot system 9; and the automatic pilot system 9 uses this information for computing the guidance commands and applying them in order to allow the aircraft to attain the required targets.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting the piloting of an aircraft during an approach phase for the purpose of a landing on a predetermined runway, said approach making it possible to join a predetermined final position (Pf) at which the aircraft (AC) must exhibit a predetermined final energy state, wherein said method comprises:
   receiving, at a reception unit, a target altitude and a target speed corresponding to the predetermined final position (Pf) relative to the predetermined runway;
   computing, by a first computation unit, a target energy state at the final position (Pf) based on the received target altitude and target speed, the target energy state corresponding to the predetermined final energy state;
   computing, by a second computation unit, an energy difference between the final energy state and the target energy state, the final energy state based on current flight parameters of the aircraft;
   computing, by a third computation unit, a dissipation distance (DΔE) allowing the aircraft (AC) to dissipate said energy difference computed by the second computation unit;
   computing, by a fourth computation unit, a limit position (Pec) for the aircraft, situated upstream of said final position (Pf), by said dissipation distance −(DΔE), along a future flight trajectory (TV) of the aircraft (AC), said limit position (Pec) being the most downstream position from where the aircraft (AC) dissipates said energy difference of the aircraft (AC) up to said final position (Pf);
   transmitting, by an information transmission unit, at least said limit position (Pec) to at least one user system, and
   receiving, at the at least one user system comprising an autopilot system, said limit position (Pec) for guiding the aircraft to the limit position (Pec); or
   receiving, at the at least one user system comprising a display unit, for displaying at least said limit position (Pec) on at least one screen in a cockpit of the aircraft.

2. The method as claimed in claim 1, wherein the computing by the fourth computation unit comprises a sub-step of estimating the future flight trajectory (TV).

3. The method as claimed in claim 1, wherein the computing by the fourth computation unit comprises:
   computing an auxiliary position (Pecm) which is situated upstream of the limit position (Pec) by a predetermined distance margin (Dm); and
   computing the distance (Davm) between a current position (PAC) of the aircraft (AC) and said auxiliary position (Pecm),
   wherein the method further comprises guiding the aircraft (AC) such that the aircraft exhibits the target energy state at most at said auxiliary position (Pecm).

4. The method as claimed in claim 1, further comprising updating the final energy state.

5. The method as claimed in claim 4, wherein the updating the final energy state includes updating the final energy state as a function of at least one of the following parameters:
   a landing weight;
   an altitude at an airport provided for the landing;
   a wind at the airport; and
   an auxiliary parameter affecting the final energy state.

6. The method as claimed in claim 1, wherein the final energy state represents a total energy.

7. The method as claimed in claim 1, wherein the receiving the target altitude and target speed includes carrying out a manual input of the target altitude and target speed.

8. The method as claimed in claim 1, wherein the receiving the target altitude and target speed includes carrying out an automatic input of the target altitude and target speed.

9. The method as claimed in claim 1, wherein the computing by the third computation unit takes account of at least one auxiliary criterion for computing the dissipation distance.

10. The method as claimed in claim 1, wherein the computing by the first computation unit includes computing the target energy state from the target altitude, the target speed, current values of flight parameters of the aircraft (AC) and predetermined patterns.

11. A device for assisting the piloting of an aircraft, during an approach phase for the purpose of a landing on a predetermined runway, said approach making it possible to join a final position (Pf) at which the aircraft (AC) must exhibit a predetermined final energy state, wherein the device comprises:
   a reception unit configured for receiving a target altitude and a target speed corresponding to the final position (Pf) relative to the predetermined runway;
   a first computation unit configured for computing a target energy state at the final position (Pf) based on the received target altitude and target speed, the target energy state corresponding to the predetermined final energy state;
   a second computation unit configured for computing an energy difference between the final energy state and the target energy state, the final energy state based on current flight parameters of the aircraft;
   a third computation unit configured for computing a dissipation distance (DΔE) making it possible for the aircraft (AC) to dissipate said energy difference computed by the second computation unit;
   a fourth computation unit configured for computing a limit position (Pec) for the aircraft situated upstream of said final position (Pf), along a future flight trajectory (TV) of the aircraft (AC), by said dissipation distance (L)AE), said limit position (Pec) being the most downstream position from where the aircraft (AC) dissipates said energy difference of the aircraft (AC) up to said final position (Pf); and
   an information transmission unit configured for transmitting at least said limit position (Pec) to at least one user system,
   wherein the at least user system comprises at least one of the following:
      an automatic pilot system configured for receiving at least said limit position (Pec) and guiding the aircraft (AC) to said limit position (Pec); or
      a display unit for displaying at least said limit position (Pec) on at least one screen in a cockpit of the aircraft.

12. The device as claimed in claim 11, further comprising an interface allowing an operator to enter data into said device and at least the target altitude and the target speed.

13. The device as claimed in claim 11, further comprising a data transmission system configured for automatically entering data into said device and at least the target altitude and the target speed.

14. An aircraft comprising a device as claimed in claim 11.

* * * * *